US012723811B2

(12) United States Patent

Zhu et al.

(10) Patent No.: US 12,723,811 B2
(45) Date of Patent: Sep. 1, 2026

(54) SEALING STRUCTURE OF HORIZONTAL ROTARY PYROLYSIS KILN

(71) Applicant: HENAN LONGCHENG COAL HIGH EFFICIENCY TECHNOLOGY APPLICATION CO., LTD., Nanyang (CN)

(72) Inventors: Shucheng Zhu, Nanyang (CN); Jinfeng Li, Nanyang (CN); Bo Zhao, Nanyang (CN); Yongxing Wang, Nanyang (CN); Xibin Wang, Nanyang (CN)

(73) Assignee: Henan Longcheng Coal High Efficiency Technology Application Co., Ltd. (CN)

(*) Notice: Subject to any disclaimer, the term of this patent is extended or adjusted under 35 U.S.C. 154(b) by 679 days.

(21) Appl. No.: 18/027,684

(22) PCT Filed: Nov. 16, 2020

(86) PCT No.: PCT/CN2020/128930
§ 371 (c)(1),
(2) Date: Mar. 22, 2023

(87) PCT Pub. No.: WO2022/068003
PCT Pub. Date: Apr. 7, 2022

(65) Prior Publication Data
US 2023/0408197 A1 Dec. 21, 2023

(30) Foreign Application Priority Data
Sep. 29, 2020 (CN) ........................ 202011069245.1

(51) Int. Cl.
*F27B 7/24* (2006.01)
*F27B 7/20* (2006.01)
(Continued)

(52) U.S. Cl.
CPC .................. *F27B 7/24* (2013.01); *F27B 7/20* (2013.01); *F27B 7/22* (2013.01); *F27D 99/0073* (2013.01);
(Continued)

(58) Field of Classification Search
CPC ...... F27B 7/20; F27B 7/22; F27B 7/24; F27D 99/0073; F27D 2099/0078; F27D 2099/0081; F27M 2003/14
(Continued)

(56) References Cited

U.S. PATENT DOCUMENTS 2,826,403 A * 3/1958 Moklebust ................ F27B 7/38 432/115
4,543,061 A * 9/1985 Edwards ............... F27B 7/3205 432/115
(Continued)

FOREIGN PATENT DOCUMENTS

CA 3185788 A1 4/2022
CN 2169103 6/1994
(Continued)

OTHER PUBLICATIONS

JP-4299954-B2—Translation (Year: 2009).*
(Continued)

*Primary Examiner* — Helena Kosanovic
*Assistant Examiner* — Benjamin W Johnson
(74) *Attorney, Agent, or Firm* — Barnes & Thornburg LLP

(57) ABSTRACT

Provided is a sealing structure for a horizontal rotary pyrolysis kiln. A movable heat-insulation sealing ring is disposed such that a heat-insulation cavity is formed between the movable heat-insulation sealing ring and a flexible sealing mechanism. The heat-insulation cavity can effectively block the heat dissipated from a kiln tail cover and a kiln tail,
(Continued)

thereby effectively reducing the ambient temperature of the flexible sealing mechanism in the heat-insulation cavity. In this way, the service life of the flexible sealing mechanism is prolonged, and the effectiveness of sealing is thus ensured.

8 Claims, 4 Drawing Sheets

(51) Int. Cl.
*F27B 7/22* (2006.01)
*F27D 99/00* (2010.01)

(52) U.S. Cl.
CPC ................ *F27D 2099/0078* (2013.01); *F27D 2099/0081* (2013.01); *F27M 2003/14* (2013.01)

(58) Field of Classification Search
USPC .......................................................... 432/115
See application file for complete search history.

(56) References Cited

U.S. PATENT DOCUMENTS

| | | | | |
|---|---|---|---|---|
| 2019/0093949 | A1* | 3/2019 | Zhu | F16J 15/3232 |
| 2020/0240710 | A1* | 7/2020 | Rauch | F27B 7/22 |

FOREIGN PATENT DOCUMENTS

| | | | | |
|---|---|---|---|---|
| CN | 106482506 | | | 3/2017 |
| CN | 209655780 | U | | 11/2019 |
| CN | 111141143 | | | 5/2020 |
| CN | 212930939 | U | | 4/2021 |
| JP | 4299954 | B2 | * | 7/2009 |
| SU | 1460569 | | | 2/1989 |

OTHER PUBLICATIONS

Office Action issued in Canadian patent application No. 3,185,788, dated May 9, 2024.
English Translation of Search Report issued in PCT/CN2020/128930 (Jul. 5, 2021).

* cited by examiner

SEALING STRUCTURE OF HORIZONTAL ROTARY PYROLYSIS KILN

CROSS-REFERENCE TO RELATED APPLICATIONS

The present application is a U.S. nationalization under 35 U.S.C. § 371 of International Application No. PCT/CN2020/128930, filed Nov. 16, 2020, which claims priority to Chinese Patent Application No. 2020110692451, entitled "Sealing Structure of Horizontal Rotary Pyrolysis Kiln", filed with China National Intellectual Property Administration on Sep. 29, 2020. The disclosures set forth in the referenced applications are each incorporated herein by reference in their entirety.

TECHNICAL FIELD

The present disclosure relates to sealing technologies of thermal sealing covers of horizontal rotary kilns, and particularly to a sealing structure of a horizontal rotary pyrolysis kiln.

BACKGROUND ART

In the field of coal pyrolysis, sealing of a discharging cover of a horizontal rotary kiln is one of most critical safety technologies and environmental protection technologies. In the prior art, some discharging covers are sealed using a fish-scale-type sealing technology, but such fish-scale-type sealing cannot completely seal coal gas in the field of coal pyrolysis, which has a great potential safety hazard; some discharging covers are sealed using a method of flexible connection and rubber sealing, the method can realize complete sealing, but a flexible sealing material has limited durability and short service life.

In view of this, the present disclosure is particularly proposed.

SUMMARY

Objects of the present disclosure include, for example, provision of a sealing structure of a horizontal rotary pyrolysis kiln to solve at least one of the above technical problems.

The present disclosure is implemented as follows.

A sealing structure (sealing mechanism) of a horizontal rotary pyrolysis kiln is provided between a kiln tail cover and a kiln tail, and includes:

- a support frame fixedly connected to a periphery of the kiln tail, wherein the support frame is provided with a rotary sealing mechanism (rotary sealing structure) in rotary sealing contact with the support frame;
- the rotary sealing mechanism includes: a plurality of evenly distributed shifting forks; a support seat rotatably connected with the support frame; a first limiting fitting part with one end fixed to a periphery of the kiln tail cover; and a movable heat-insulation sealing ring and a flexible sealing mechanism connected between the support seat and the first limiting fitting part;
- the shifting fork is spatially located on an outer side of the flexible sealing mechanism, one end of the shifting fork is fixedly connected with the first limiting fitting part on the periphery of the kiln tail cover, and the other end of the shifting fork is movably connected to the support seat; the movable heat-insulation sealing ring is spatially located on an inner side of the flexible sealing mechanism; and
- one end of the movable heat-insulation sealing ring is fixedly connected with the support seat, and the other end of the movable heat-insulation sealing ring is movably connected with the first limiting fitting part, such that a heat-insulation cavity is formed between the movable heat-insulation sealing ring and the flexible sealing mechanism.

In the present disclosure, the movable heat-insulation sealing ring is disposed such that the heat-insulation cavity is formed between the movable heat-insulation sealing ring and the flexible sealing mechanism. The heat-insulation cavity can effectively block the heat dissipated from the kiln tail cover and the kiln tail, thereby effectively reducing the ambient temperature of the flexible sealing mechanism in the heat-insulation cavity. In this way, the service life of the flexible sealing mechanism is prolonged, and the effectiveness of sealing is thus ensured.

One end of the movable heat-insulation sealing ring is movably connected with the first limiting fitting part, and such an arrangement may ensure that when the rotary sealing mechanism jumps up, down, left and right, the movable heat-insulation sealing ring may be in left-right or up-down jumping connection with the first limiting fitting part, instead of being fixedly connected with the first limiting fitting part, such that the flexible sealing mechanism can also move freely.

In use, the support frame and the kiln tail rotate coaxially, the support seat of the rotary sealing mechanism does not rotate coaxially with the support frame, and when the kiln tail rotates eccentrically, the support seat jumps up, down, left and right to drive one end of the shifting fork apart from the first limiting fitting part to jump up, down, left and right, and the jump of the support seat is absorbed by the flexible sealing mechanism and the movable heat-insulation sealing ring, such that the kiln tail cover is still kept fixed.

The rotary sealing mechanism and the kiln tail rotate relatively by providing the shifting fork, and the rotary sealing mechanism itself does not rotate and only jumps with the eccentric rotation of the kiln tail, such that the flexible sealing mechanism only jumps without generating torsional stress, thus prolonging the service life of the flexible sealing mechanism.

In one or more embodiments, the support seat includes a second limiting fitting part configured to be connected with the shifting fork, the flexible sealing mechanism and the movable heat-insulation sealing ring, respectively; and the second limiting fitting part is annular.

In one or more embodiments, the second limiting fitting part is in a shape of a vertical annular plate.

In one or more embodiments, the second limiting fitting part is provided with a gas loading pipeline, and the gas loading pipeline is communicated with the heat-insulation cavity to load a gas medium.

The gas pressure between the flexible sealing mechanism and the movable heat-insulation sealing ring is kept greater than the pyrolysis coal gas pressure of the pyrolysis kiln; the selectable gas medium of a gas loading mechanism is: nitrogen, purified coal gas, or gas which does not react with pyrolysis coal gas, such as steam, or the like, and preferably purified coal gas.

The gas loaded into the heat-insulation cavity through the gas loading pipeline further enhances the cooling effect for the flexible sealing mechanism, and when the movable heat-insulation sealing ring cannot realize complete sealing, only the gas entering the heat-insulation cavity enters the kiln tail, and a reverse situation is impossible, such that the flexible sealing mechanism is not in a high temperature environment, thus greatly prolonging the service life of the flexible sealing mechanism. Coal gas as the loaded gas medium is more helpful to guarantee the purity of a coal gas system and facilitates the coal gas not to reduce the heat value.

In one or more embodiments, the second limiting fitting part is provided with a second mounting hole for mounting the shifting fork, one end of the shifting fork penetrates through the second mounting hole, a periphery of the shifting fork is in contact connection with a hole wall of the second mounting hole, and a space for allowing the shifting fork to jump is reserved in the second mounting hole.

The gas pressure between the flexible sealing mechanism and the movable heat-insulation sealing ring is set to be greater than the pyrolysis coal gas pressure of the pyrolysis kiln, and when a certain gap exists between a movable contact end of the movable heat-insulation sealing ring and the first limiting fitting part (when the rotary sealing mechanism jumps), gas can flow out of the heat-insulation cavity to prevent the pyrolysis coal gas of the pyrolysis kiln from entering the heat-insulation cavity.

In one or more embodiments, the shifting fork is provided with a compression mechanism on an outer side of the second mounting hole, so as to press the second limiting fitting part to the first limiting fitting part to keep the movable heat-insulation sealing ring tightly attached to the first limiting fitting part; and the compression mechanism is a spring compression mechanism or a rubber compression mechanism.

The compression mechanism has an effect of pressing the second limiting fitting part to the first limiting fitting part, so as to allow the movable heat-insulation sealing ring to keep tight attachment, and therefore, the heat-insulation cavity is kept tight.

The compression mechanism is a spring compression mechanism or rubber; the spring compression mechanism includes two spring seats, a compression spring, a backing plate, a gasket and a fixing screw, one of the two spring seats abuts against the second limiting fitting part, the other spring seat is provided apart from the second limiting fitting part, the compression spring is located between the two spring seats, the backing plate is provided on an outer side of the spring seat apart from the second limiting fitting part, the gasket is provided on one side of the backing plate apart from the compression spring, and the fixing screw is fixedly connected with an end portion of the elastic shifting fork to press the gasket, the backing plate and the compression spring.

The fixing screw is fixedly connected with the end portion of the elastic shifting fork to press the gasket, the backing plate and the compression spring, so as to press the second limiting fitting part to get close to the first limiting fitting part, such that a movable contact end surface of the movable heat-insulation sealing ring abuts against a sealing surface of the first limiting fitting part to realize heat insulation for the flexible sealing mechanism.

In one or more embodiments, an oil supply pipeline is further provided at a position of the movable heat-insulation sealing ring close to the second limiting fitting part, so as to reduce the friction force between the movable heat-insulation sealing ring and the first limiting fitting part.

In one or more embodiments, one end of the first limiting fitting part apart from the shifting fork is connected with a kiln tail cover water tank, and the kiln tail cover water tank is fixedly mounted at an end portion of the kiln tail cover close to the second limiting fitting part.

The kiln tail cover water tank is provided on the kiln tail cover, such that when the coal gas reaches a sealing position, the temperature of the coal gas is reduced in advance to guarantee the sealing reliability.

The support frame fixedly provided on the periphery of the kiln tail is further provided with an adjusting screw, and the jump of an annular sealing surface of the support frame along with the rotary motion of the kiln tail is adjusted to be minimum by the adjusting screw. Such an arrangement is favorable for reduction of the jump of the rotary sealing mechanism, thereby reducing the jump amplitude of the flexible sealing mechanism and prolonging the service life of the flexible sealing mechanism. Furthermore, the arrangement of the support frame can also reduce the friction force between the rotary sealing mechanism and the support frame, thereby prolonging the service life of the rotary sealing mechanism.

In one or more embodiments, the peripheral annular sealing surface of the support frame is provided with a $Si_3N_4$ material and has surface roughness less than 0.4 microns. The material has high hardness, a self-lubricating function and a quite small surface friction coefficient, which is helpful to prolong the service life of the whole rotary sealing mechanism.

In one or more embodiments, the support seat includes: the second limiting fitting part movably connected with the shifting fork; and a left ring groove fixedly connected with the second limiting fitting part; and the flexible sealing mechanism is fixedly connected to one end of the left ring groove apart from the second limiting fitting part.

Such an embodiment helps to shorten the lengths of the movable heat-insulation sealing ring and the flexible sealing mechanism in the axial direction.

In one or more embodiments, a right ring groove is connected to an end portion of the first limiting fitting part close to the kiln tail cover, and one end of the right ring groove apart from the first limiting fitting part is fixedly connected with one end of the flexible sealing mechanism; the movable heat-insulation sealing ring is provided between the left ring groove and the right ring groove, and a movable end of the movable heat-insulation sealing ring is movably connected with a friction ring provided on the right ring groove.

A sealing structure of a horizontal rotary pyrolysis kiln includes: a horizontal rotary pyrolysis kiln body, a kiln tail, a kiln tail cover and a rotary sealing mechanism, wherein a discharging opening configured for discharging pyrolyzed solid materials is provided below the kiln tail cover, a pyrolysis coal gas outlet is formed in a center of an end face of the kiln tail, a heat insulation layer of the horizontal rotary pyrolysis kiln tail cover is provided on a periphery of the kiln tail cover, and a kiln-tail outer heat-insulation layer is provided on a periphery of the kiln tail.

In one or more embodiments, a support frame is fixedly provided on the periphery of the kiln tail, the support frame and the kiln tail rotate synchronously, and the support frame is fixedly connected or detachably connected with the kiln tail; the support frame includes a support frame inner ring provided on the periphery of the kiln tail, a support frame two-side adjusting plate, an adjusting screw provided on the support frame two-side adjusting plate, a vertical sealing and welding plate of the support frame inner ring, a lifting lug, a first ring plate with holes outside the support frame inner ring, a second ring plate outside the support frame inner ring, a sealing lining plate of the rotary sealing mechanism and a set screw.

In one or more embodiments, the support frame two-side adjusting plate is composed of a plurality of plate strips, the plural plate strips are uniformly dispersed on peripheries of two sides of the support frame inner ring and welded to the support frame inner ring, a threaded hole is formed in the support frame two-side adjusting plate, and the adjusting screw is screwed into the threaded hole in the support frame two-side adjusting plate.

In one or more embodiments, two ends of the vertical sealing and welding plate of the support frame inner ring are hermetically welded to an outer wall of the kiln tail and an end surface of the support frame inner ring respectively; inner circles of the first ring plate with holes outside the support frame inner ring and the second ring plate outside the support frame inner ring are welded to a left side and a right side of the support frame inner ring respectively, and the sealing lining plate of the rotary sealing mechanism is fitted over and hermetically welded to outer circles of the first ring plate with holes outside the support frame inner ring and the second ring plate outside the support frame inner ring.

In one or more embodiments, an annular wear-resisting plate of a rotary sealing mechanism is provided on a periphery of the sealing lining plate of the rotary sealing mechanism.

In one or more embodiments, the annular wear-resisting plate of the rotary sealing mechanism is a $Si_3N_4$ bearing bush.

In one or more embodiments, the rotary sealing mechanism is provided on a periphery of an annular sealing surface of the support frame, and the rotary sealing mechanism includes a support seat rotatably connected with the support frame, a shifting fork, a first limiting fitting part, a movable heat-insulation sealing ring and a flexible sealing mechanism.

In one or more embodiments, the support seat includes a second limiting fitting part, a sealing ring cavity, a sealing-ring spacer ring, a sealing ring, a left friction-ring support seat, a right friction-ring support seat, a friction ring, a friction-ring oil groove and an oil line, the sealing ring cavity and the second limiting fitting part are welded, sealed and fixedly combined, two sealing rings are provided in the sealing ring cavity, and the sealing-ring spacer ring is provided between the two sealing rings.

In one or more embodiments, a boss is provided on one side of the left friction-ring support seat close to the sealing ring, and the left friction-ring support seat and the sealing ring cavity allow the boss to press the sealing ring and the sealing-ring spacer ring by a bolt.

In one or more embodiments, the right friction-ring support seat is provided on a right side of the second limiting fitting part and hermetically welded to the second limiting fitting part, and the plurality of friction rings are provided in supports of the left friction-ring support seat and the right friction-ring support seat respectively.

In one or more embodiments, each of the plural friction rings is provided with the friction-ring oil groove, and the oil line is communicated with the friction-ring oil groove and oil grooves of the two sealing rings respectively.

Compared with the prior art, the present disclosure has the following beneficial effects.

The present disclosure provides the sealing structure of a horizontal rotary pyrolysis kiln. In the present disclosure, the movable heat-insulation sealing ring is disposed such that the heat-insulation cavity is formed between the movable heat-insulation sealing ring and the flexible sealing mechanism. The heat-insulation cavity can effectively block the heat dissipated from the kiln tail cover and the kiln tail, thereby effectively reducing the ambient temperature of the flexible sealing mechanism in the heat-insulation cavity. In this way, the service life of the flexible sealing mechanism is prolonged, and the effectiveness of sealing is thus ensured.

BRIEF DESCRIPTION OF DRAWINGS

To describe the technical solutions in the embodiments of the present disclosure more clearly, the following briefly describes the accompanying drawings required in the embodiments. It should be understood that the following accompanying drawings show merely some embodiments of the present disclosure and therefore should not be considered as limiting the scope, and a person of ordinary skill in the art may still derive other related drawings from these accompanying drawings without creative efforts.

Figure 1:
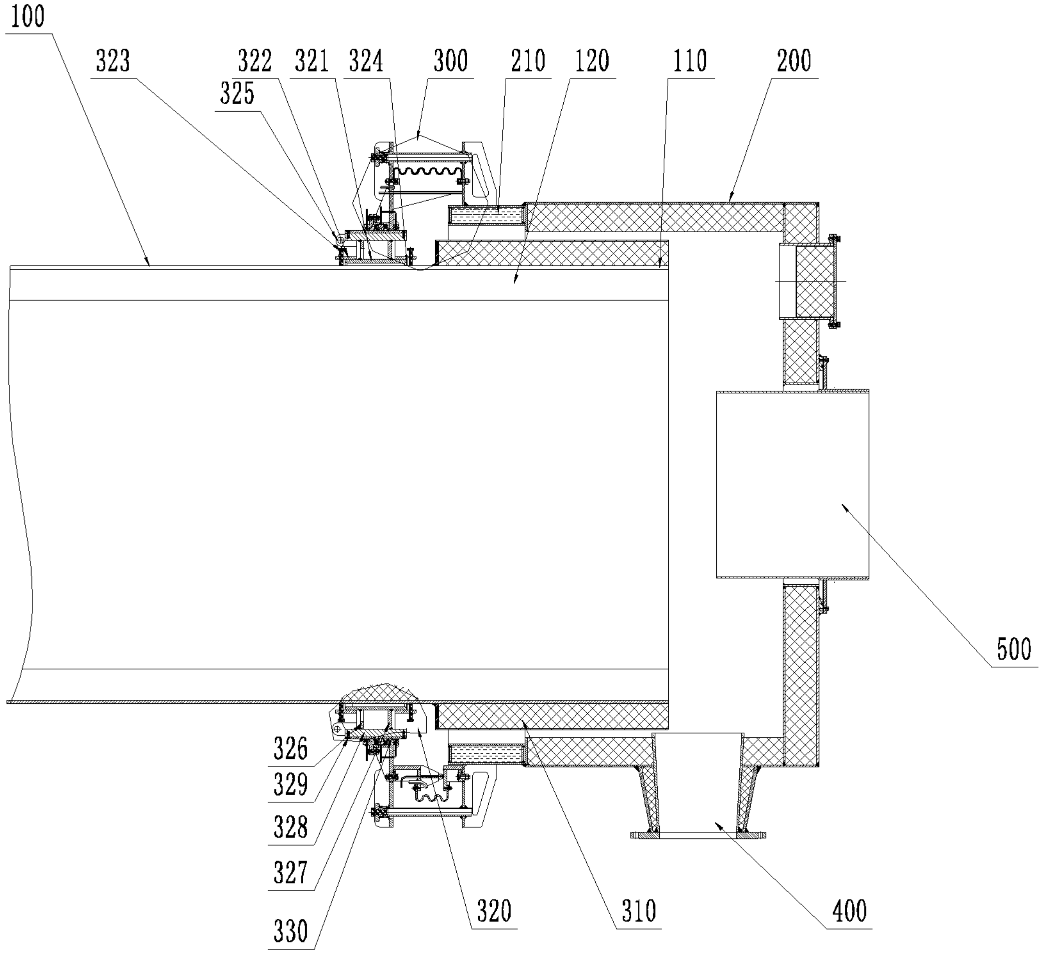
FIG. 1 is a schematic diagram of a sealing structure of a horizontal rotary pyrolysis kiln according to the first embodiment.

Reference numerals: 100—horizontal rotary pyrolysis kiln body; 110—kiln tail; 120—heat insulation layer of horizontal rotary pyrolysis kiln tail cover; 200—kiln tail cover; 210—kiln tail cover cooling water tank; 300—rotary sealing mechanism; 310—kiln-tail outer heat-insulation layer; 320—support frame; 321—support frame inner ring; 322—support frame two-side adjusting plate; 323—adjusting screw; 324—vertical sealing and welding plate of support frame inner ring; 325—lifting lug; 326—first ring plate with holes outside support frame inner ring; 327—second ring plate outside support frame inner ring; 328—sealing lining plate of rotary sealing mechanism; 329—set screw; 330—annular wear-resisting plate of rotary sealing mechanism; 331—first vertical annular plate of rotary sealing mechanism; 332—sealing ring cavity; 333—sealing-ring spacer ring; 334—sealing ring; 335—left friction-ring support seat; 336—right friction-ring support seat; 337—friction ring; 338—friction-ring oil groove; 339—oil line; 340—left ring groove; 341—left packing; 342—second kiln-tail vertical annular plate; 343—right ring groove; 344—right packing; 345—movable heat-insulation sealing ring; 346—friction ring of movable heat-insulation sealing ring; 347—oil supply device; 348—flexible sealing mechanism; 349—gas loading pipeline; 350—shifting fork; 351—spring seat; 352—spring; 353—backing plate; 354—gasket; 355—fixing screw; 400—discharging opening; 500—coal gas outlet.

DETAILED DESCRIPTION OF EMBODIMENTS

To make the objectives, technical solutions and advantages of the embodiments of the present disclosure clearer, the technical solutions in the embodiments of the present disclosure are clearly and completely described with reference to the accompanying drawings in the embodiments of the present disclosure, and apparently, the described embodiments are not all but a part of the embodiments of the present disclosure. Generally, the assemblies of the embodiments of the present disclosure described and illustrated in the drawings herein may be arranged and designed in a variety of different configurations.

Accordingly, the following detailed description of the embodiments of the present disclosure provided in the drawings is not intended to limit the scope of protection of the present disclosure, but only represents selected embodiments of the present disclosure. All other embodiments obtained by a person of ordinary skill in the art based on the embodiments of the present disclosure without creative efforts shall fall within the protection scope of the present disclosure.

It should be noted that similar reference signs and letters denote similar items in the following drawings. Therefore, once a certain item is defined in one figure, it does not need to be further defined and explained in the subsequent figures.

In descriptions of the present disclosure, it should be noted that, directions or positional relationships indicated by terms “center”, “upper”, “lower”, “left”, “right”, “vertical”, “horizontal”, “inner”, “outer”, “clockwise”, “anticlockwise”, etc. are based on orientations or positional relationships shown in the accompanying drawings, or orientations or positional relationships of conventional placement of the product according to the present disclosure in use, and they are used only for describing the present disclosure and for description simplicity, but do not indicate or imply that an indicated device or element must have a specific orientation or be constructed and operated in a specific orientation. Therefore, it cannot be understood as a limitation on the present disclosure. In addition, the terms such as “first”, “second”, “third”, or the like, are only used for distinguishing descriptions and are not intended to indicate or imply relative importance.

In addition, the terms of “horizontal”, “vertical”, and “overhung” and so on do not represent that the means is absolutely horizontal or overhung but it can be slightly tilted. For example, “horizontal” only means that the direction is more horizontal than “vertical” and can be slightly tilted, instead that this structure has to be horizontal completely.

In the description of the present disclosure, it still should be noted that unless specified or limited otherwise, the terms “provide”, “mount”, “connect”, and “couple” and the like are used broadly, and may be, for example, fixed connections, detachable connections, or integral connections; may also be mechanical or electrical connections; may also be direct connections or indirect connections via intervening structures; may also be inner communications of two elements. The specific meanings of the above terms in the present disclosure can be understood by those skilled in the art according to specific situations.

Figure 2:
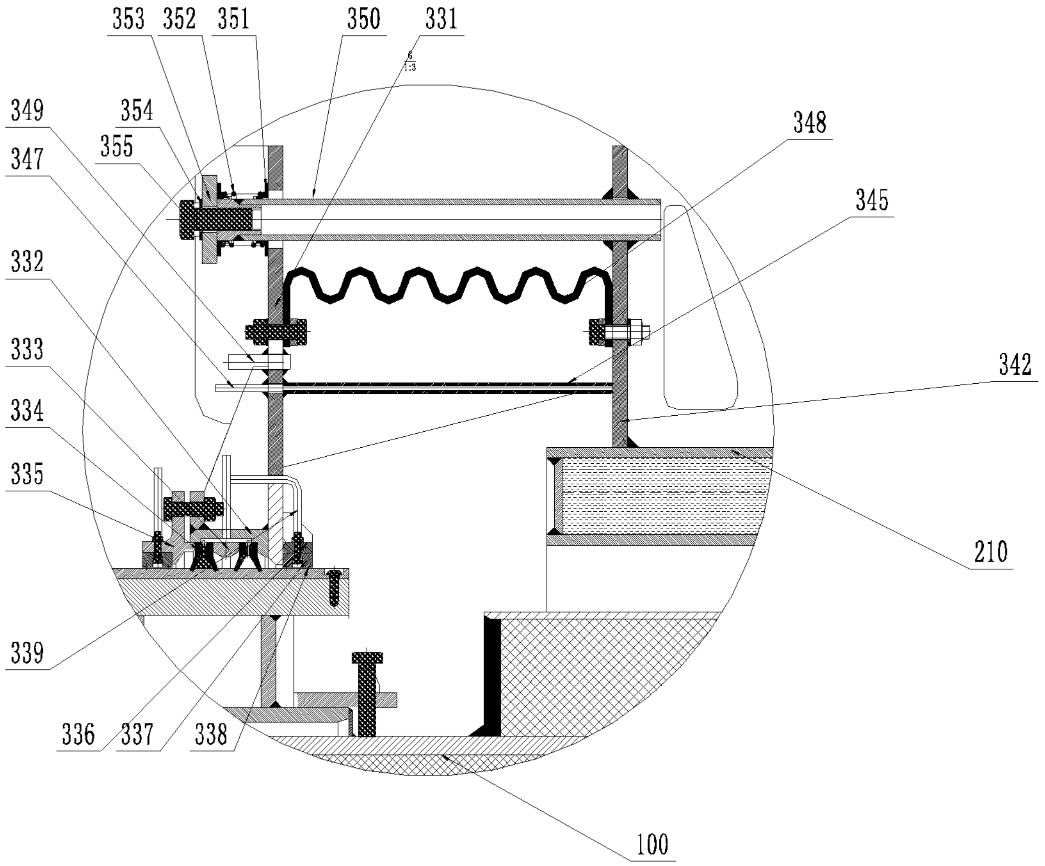
FIG. 2 is a partial enlarged view of a rotary sealing mechanism of FIG. 1.

Referring to FIGS. 1 and 2, the present embodiment provides a sealing structure of a horizontal rotary pyrolysis kiln. The sealing structure includes: a horizontal rotary pyrolysis kiln body 100, a kiln tail 110, a kiln tail cover 200 and a rotary sealing mechanism 300. A discharging opening 400 configured for discharging pyrolyzed solid materials is provided below the kiln tail cover 200, and a pyrolysis coal gas outlet 500 is formed in a center of an end face of the kiln tail. A heat insulation layer 120 of the horizontal rotary pyrolysis kiln tail cover is provided on a periphery of the kiln tail cover 200. A kiln-tail outer heat-insulation layer 310 is provided on a periphery of the kiln tail 110.

It should be noted that the present disclosure does not limit the specific materials of the heat insulation layer 120 and the kiln-tail outer heat insulation-layer 310 as long as the heat insulation effect can be achieved.

Referring to FIG. 1, a support frame 320 is fixedly provided on a periphery of the kiln tail 110, the support frame 320 and the kiln tail 110 rotate synchronously, and the support frame 320 is fixedly connected or detachably connected with the kiln tail 110. The support frame 320 includes a support frame inner ring 321 provided on the periphery of the kiln tail 110, a support frame two-side adjusting plate 322, an adjusting screw 323 provided on the support frame two-side adjusting plate 322, a vertical sealing and welding plate 324 of the support frame inner ring, a lifting lug 325, a first ring plate 326 with holes outside the support frame inner ring, a second ring plate 327 outside the support frame inner ring, a sealing lining plate 328 of the rotary sealing mechanism and a set screw 329.

The support frame two-side adjusting plate 322 is composed of a plurality of plate strips, the plural plate strips are uniformly dispersed on peripheries of two sides of the support frame inner ring 321 and welded to the support frame inner ring 321, a threaded hole is formed in the support frame two-side adjusting plate 322, and the adjusting screw 323 is screwed into the threaded hole in the support frame two-side adjusting plate 322. During mounting and debugging, the adjusting screw 323 is screwed in to enable the adjusting screw 323 to abut against an outer wall of the kiln tail 110, and whether the support frame inner ring 321 is concentric with the outer wall of the kiln tail 110 can be adjustably determined by adjusting the adjusting screw 323.

Two ends of the vertical sealing and welding plate 324 of the support frame inner ring are hermetically welded to the outer wall of the kiln tail 110 and an end surface of the support frame inner ring 321 respectively; inner circles of the first ring plate 326 with holes outside the support frame inner ring and the second ring plate 327 outside the support frame inner ring are welded to a left side and a right side of the support frame inner ring 321 respectively. The sealing lining plate 328 of the rotary sealing mechanism is fitted over and hermetically welded to outer circles of the first ring plate 326 with holes outside the support frame inner ring and the second ring plate 327 outside the support frame inner ring.

In order to make an annular sealing surface smooth and resistant to wear, an annular wear-resisting plate 330 of the rotary sealing mechanism is provided on a periphery of the sealing lining plate 328 of the rotary sealing mechanism. In the present embodiment, the annular wear-resisting plate 330 is selected to be a Si3N4 bearing bush. A plurality of Si3N4 bearing bushes may be provided, each Si3N4 bearing bush is hermetically and tightly attached to the sealing lining plate 328 of the rotary sealing mechanism, a screw via hole is formed in the Si3N4 bearing bush, and the Si3N4 bearing bush and the sealing lining plate 328 of the rotary sealing mechanism are tightly connected together by the set screw 329 penetrating through the screw via hole formed in the Si3N4 bearing bush.

It should be noted that the present disclosure does not limit the type of the annular wear-resisting plate 330 as long as the annular sealing surface is smooth and resistant to wear.

Gaps between adjacent Si3N4 bearing bushes can be filled with heat-resistant and wear-resistant glue.

The adjustment of the adjusting screw 323 has a purpose that when the rotary kiln rotates, the jump of an outer surface of the Si3N4 bearing bush is as small as possible.

The lifting lug 325 on the support frame 320 and the sealing lining plate 328 of the rotary sealing mechanism are welded together for hoisting.

Referring to FIG. 1, the rotary sealing mechanism 300 is provided on a periphery of the annular sealing surface of the support frame 320. The rotary sealing mechanism 300 includes a support seat (not shown) rotatably connected with the support frame 320, a shifting fork 350, a first limiting fitting part (in the present disclosure, the first limiting fitting part is specifically a second kiln-tail vertical annular plate 342), a movable heat-insulation sealing ring 345 and a flexible sealing mechanism 348.

Referring to FIG. 2, the support seat includes a second limiting fitting part (in the present disclosure, the second limiting fitting part is specifically a first vertical annular plate 331 of the rotary sealing mechanism), a sealing ring cavity 332, a sealing-ring spacer ring 333, a sealing ring 334, a left friction-ring support seat 335, a right friction-ring support seat 336, a friction ring 337, a friction-ring oil groove 338, and an oil line 339.

The sealing ring cavity 332 and the first vertical annular plate 331 of the rotary sealing mechanism are welded, sealed and fixedly combined, two sealing rings 334 are provided in the sealing ring cavity 332, and the sealing-ring spacer ring 333 is provided between the two sealing rings 334.

In the present embodiment, the two sealing rings 334 are Y-shaped sealing rings. In other embodiments, J-shaped sealing rings or sealing rings of other shapes may be provided as required, and the present disclosure does not limit the specific type of the sealing rings.

A boss is provided on one side of the left friction-ring support seat 335 close to the sealing ring 334, and the left friction-ring support seat 335 and the sealing ring cavity 332 allow the boss to press the sealing ring 334 and the sealing-ring spacer ring 333 tightly by a bolt.

The right friction-ring support seat 336 is provided on a right side of the first vertical annular plate 331 of the rotary sealing mechanism and is hermetically welded to the first vertical annular plate 331 of the rotary sealing mechanism, and the plural friction rings 337 are provided in supports of the left friction-ring support seat 335 and the right friction-ring support seat 336 respectively.

Each of the plural friction rings 337 is provided with the friction-ring oil groove 338, and the oil line 339 is communicated with the friction-ring oil groove 338 and oil grooves of the two sealing rings 334 respectively.

Circumferential motion (rotatable connection) and sealing friction are performed respectively between the friction ring 337 and the annular wear-resisting plate which is the Si3N4 bearing bush 330, and between the two sealing rings 334 and the annular wear-resisting plate which is the Si3N4 bearing bush 330. Since the annular wear-resisting plate which is the Si3N4 bearing bush 330 has high hardness, a smooth surface and a self-lubricating function, the whole rotary sealing mechanism 300 has a reliable sealing performance and a longer service life.

The kiln tail cover 200 is fixedly connected with a kiln tail cover cooling water tank 210, and the second kiln-tail vertical annular plate 342 is fixedly connected to the kiln tail cover cooling water tank 210.

Referring to FIG. 2, a left side of the first vertical annular plate 331 of the rotary sealing mechanism is movably connected with the shifting fork 350.

The first vertical annular plate 331 of the rotary sealing mechanism and the second kiln-tail vertical annular plate 342 are oppositely arranged, and the movable heat-insulation sealing ring 345 is provided therebetween.

A left end surface of the movable heat-insulation sealing ring 345 and the first vertical annular plate 331 of the rotary sealing mechanism are fixedly sealed, and a right end surface thereof is in contact with the second kiln-tail vertical annular plate 342. To reduce the friction area, the right end surface of the movable heat-insulation sealing ring 345 is provided in an arc shape.

The flexible sealing mechanism 348 is provided on a periphery of the movable heat-insulation sealing ring 345, and the flexible sealing mechanism and the movable heat-insulation sealing ring 345 spatially form a heat-insulation cavity.

The shifting fork 350 is provided on the first vertical annular plate 331 of the rotary sealing mechanism and the second kiln-tail vertical annular plate 342, one end of the shifting fork 350 is fixedly connected with the second kiln-tail vertical annular plate 342, the other end of the shifting fork 350 penetrates through the first vertical annular plate 331 of the rotary sealing mechanism, and a movable interval is reserved in a hole penetrating through the first vertical annular plate 331 of the rotary sealing mechanism in the radial direction of the kiln, that is, the first vertical annular plate 331 of the rotary sealing mechanism is movably connected with the shifting fork 350. Optionally, the shifting fork 350 is an elastic shifting fork.

The shifting fork 350 is provided with a spring compression mechanism outside the first vertical annular plate 331 of the rotary sealing mechanism.

Referring to FIG. 2, the spring compression mechanism includes a spring seat 351, a spring 352, a backing plate 353, a gasket 354, and a fixing screw 355.

In the present embodiment, two spring seats 351 are arranged. One spring seat abuts against the second kiln-tail vertical annular plate 342, and the other spring seat is apart from the second kiln-tail vertical annular plate 342. The spring 352 is located between the two spring seats 351, the backing plate 353 is provided on an outer side of the spring seat 351 apart from the second kiln-tail vertical annular plate 342, the gasket 354 is provided on one side of the backing plate 353 apart from the spring 352, and the fixing screw 355 is screwed through threads at an end of the shifting fork 350 to press the gasket 354, the backing plate 353 and the spring 352, such that the first vertical annular plate 331 of the rotary sealing mechanism is pressed and gets close to the second kiln-tail vertical annular plate 342, and the arc-shaped end surface of the movable heat-insulation sealing ring 345 is thus in close contact with a sealing surface of the second kiln-tail vertical annular plate 342, so as to realize heat insulation for the flexible sealing mechanism 348.

To further reduce the ambient temperature of the flexible sealing mechanism 348, a gas loading pipeline 349 is provided on the first vertical annular plate 331 of the rotary sealing mechanism. The gas loading pipeline 349 is spatially located between the movable heat-insulation sealing ring 345 and the flexible sealing mechanism 348.

A gas medium for charging the gas loading pipeline 349 may be nitrogen or purity coal gas. The purity coal gas is preferred, which makes pyrolysis coal gas purer.

In order to reduce the friction force of the arc-shaped end surface of the movable heat-insulation sealing ring 345 during the rotation and jump of the rotary kiln, an oil supply device 347 is further provided on the movable heat-insulation sealing ring 345.

In order to strengthen the strength of the first vertical annular plate 331 of the rotary sealing mechanism, the second kiln-tail vertical annular plate 342 and the movable heat-insulation sealing ring 345, reinforcing ribs can be added appropriately in other embodiments.

Figure 3:
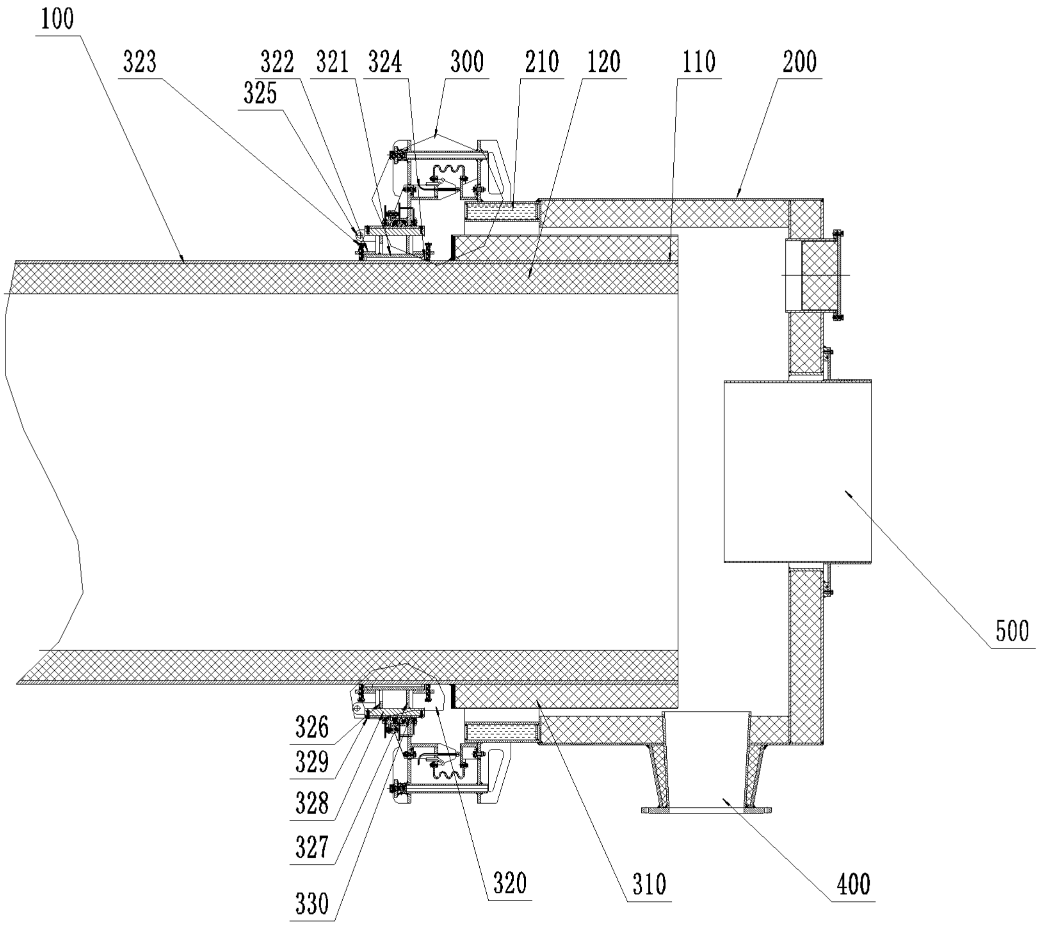
FIG. 3 is another sealing structure between horizontal rotary pyrolysis kiln tail cover and a kiln tail according to the second embodiment.
Figure 4:
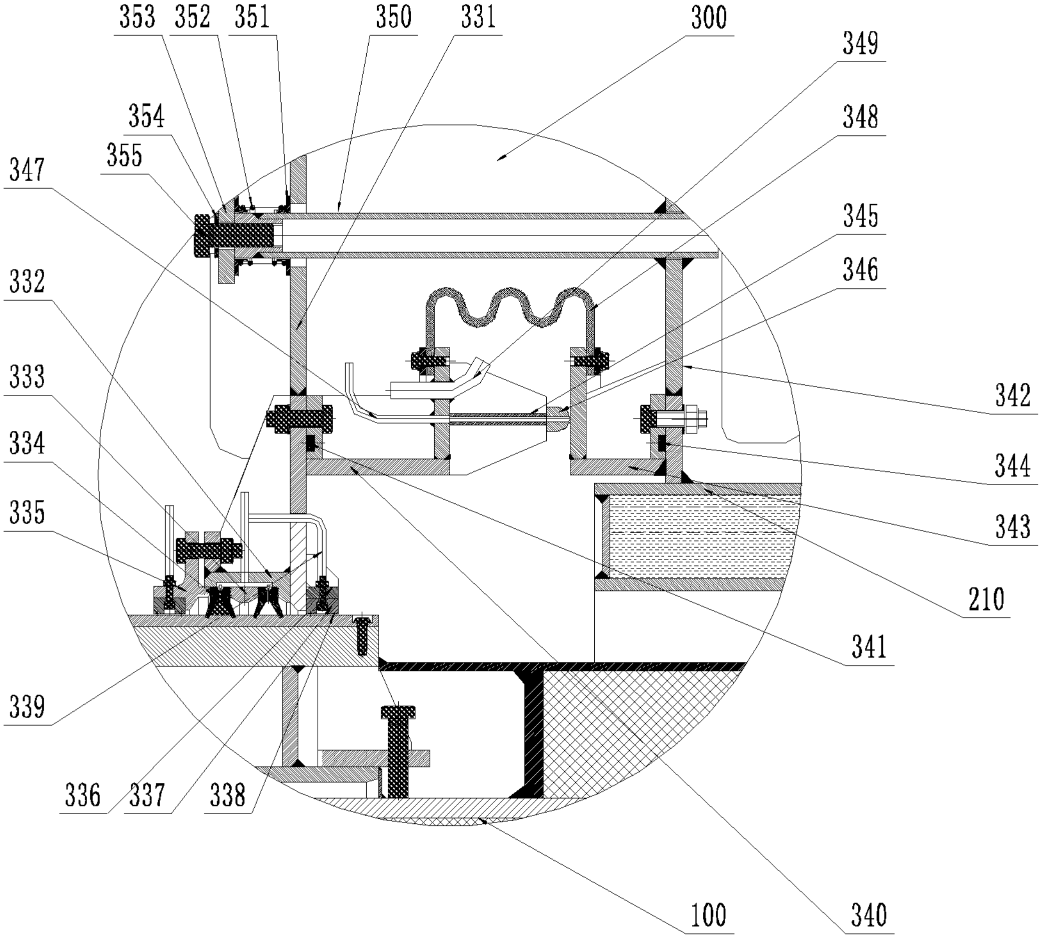
FIG. 4 is a partial enlarged view of a rotary sealing mechanism of FIG. 3.

Referring to FIGS. 3 and 4, in order to shorten the axial lengths of the movable heat-insulation sealing ring 345 and the flexible sealing mechanism 348, a groove-type circular ring is added between the first vertical annular plate 331 of the rotary sealing mechanism and the second kiln-tail vertical annular plate 342.

Correspondingly, a left ring groove 340, left packing 341, a right ring groove 343, right packing 344 and a friction ring 346 of the movable heat-insulation sealing ring are additionally provided, the left ring groove 340 is fixedly connected with the first vertical annular plate 331 of the rotary sealing mechanism, and one end of the left ring groove 340 apart from the first vertical annular plate 331 of the rotary sealing mechanism is fixedly connected with the flexible sealing mechanism 348.

An end portion of the second kiln-tail vertical annular plate 342 close to the kiln tail cover is connected with the right ring groove 343, and one end of the right ring groove 343 apart from the second kiln-tail vertical annular plate 342 is fixedly connected with one end of the flexible sealing mechanism 348; the movable heat-insulation sealing ring 345 is provided between the left ring groove 340 and the right ring groove 343, and a movable end of the movable heat-insulation sealing ring 345 is movably connected with the friction ring 346 of the movable heat-insulation sealing ring provided on the right ring groove 343.

The above is only a preferred embodiment of the present disclosure and is not intended to limit the present disclosure, and various modifications and changes may be made to the present disclosure by those skilled in the art. Any modification, equivalent replacement, or improvement made within the spirit and principle of the present disclosure shall be included in the protection scope of the present disclosure.

INDUSTRIAL APPLICABILITY

In the sealing structure of a horizontal rotary pyrolysis kiln according to the present disclosure, the movable heat-insulation sealing ring is disposed such that the heat-insulation cavity is formed between the movable heat-insulation sealing ring and the flexible sealing mechanism. The heat-insulation cavity can effectively block the heat dissipated from the kiln tail cover and the kiln tail, thereby effectively reducing the ambient temperature of the flexible sealing mechanism in the heat-insulation cavity. In this way, the service life of the flexible sealing mechanism is prolonged, and the effectiveness of sealing is thus ensured.

What is claimed is:

1. A sealing structure of a horizontal rotary pyrolysis kiln, wherein the sealing structure of a horizontal rotary pyrolysis kiln is provided between a kiln tail cover and a kiln tail, and comprises: a support frame fixedly connected to a periphery of the kiln tail, wherein the support frame is provided with a rotary sealing mechanism in rotary sealing contact with the support frame;

the rotary sealing mechanism comprises: a plurality of evenly distributed shifting forks; a support seat rotatably connected with the support frame; a first limiting fitting part with one end fixed to a periphery of the kiln tail cover; and a movable heat-insulation sealing ring and a flexible sealing mechanism connected between the support seat and the first limiting fitting part;

each of the shifting forks is spatially located on an outer side of the flexible sealing mechanism, one end of each of the shifting forks is fixedly connected with the first limiting fitting part on the periphery of the kiln tail cover, and the other end of each of the shifting forks is movably connected to the support seat; and the movable heat-insulation sealing ring is spatially located on an inner side of the flexible sealing mechanism; and one end of the movable heat-insulation sealing ring is fixedly connected with the support seat, and the other end of the movable heat-insulation sealing ring is movably connected with the first limiting fitting part, such that a heat-insulation cavity is formed between the movable heat-insulation sealing ring and the flexible sealing mechanism, wherein the support seat comprises a second limiting fitting part configured to be connected with the shifting forks, the flexible sealing mechanism and the movable heat-insulation sealing ring, respectively; the second limiting fitting part is annular, wherein the second limiting fitting part is provided with a gas loading pipeline, and the gas loading pipeline is communicated with the heat-insulation cavity to load a gas medium.

2. The sealing structure according to claim 1, wherein the second limiting fitting part is provided with a mounting hole, one end of each of the shifting forks penetrates through the mounting hole, a periphery of each of the shifting forks is in contact connection with a hole wall of the mounting hole, and a space for allowing the shifting forks to jump is reserved in the mounting hole.

3. The sealing structure according to claim 2, wherein each of the shifting forks is provided with a compression mechanism on an outer side of the mounting hole, so as to press the second limiting fitting part towards the first limiting fitting part to keep the movable heat-insulation sealing ring tightly attached to the first limiting fitting part; the compression mechanism is a spring compression mechanism or a rubber compression mechanism; the spring compression mechanism comprises two spring seats, a compression spring, a backing plate, a gasket and a fixing screw, one of the two spring seats abuts against the second limiting fitting part, the other spring seat is provided apart from the second limiting fitting part, the compression spring is located between the two spring seats, the backing plate is provided on an outer side of the spring seat apart from the second limiting fitting part, the gasket is provided on one side of the backing plate apart from the compression spring, and the fixing screw is fixedly connected with an end portion of an elastic shifting fork to press the gasket, the backing plate and the compression spring.

4. The sealing structure according to claim 3, wherein an oil supply pipeline is further provided at a side of the movable heat-insulation sealing ring towards the second limiting fitting part, so as to reduce a friction force between the movable heat-insulation sealing ring and the first limiting fitting part.

5. The sealing structure according to claim 1, wherein one end of the first limiting fitting part apart from the shifting forks is connected with a kiln tail cover water tank, and the kiln tail cover water tank is fixedly mounted at an end portion of the kiln tail cover towards the second limiting fitting part.

6. The sealing structure according to claim 5, wherein the support seat comprises: the second limiting fitting part movably connected with the shifting forks; and a left ring groove fixedly connected with the second limiting fitting part;

the flexible sealing mechanism is fixedly connected to one end of the left ring groove apart from the second limiting fitting part;

a right ring groove is connected to an end portion of the first limiting fitting part towards the kiln tail cover, and one end of the right ring groove apart from the first limiting fitting part is fixedly connected with one end of the flexible sealing mechanism; and the movable heat-insulation sealing ring is provided between the left ring groove and the right ring groove, and a movable end of the movable heat-insulation sealing ring is movably connected with a friction ring provided on the right ring groove.

7. The sealing structure according to claim 1, wherein the support frame is provided with an adjusting screw.

8. The sealing structure according to claim 1, wherein a peripheral annular sealing surface of the support frame is provided with a $Si_3N_4$ material and has a surface roughness less than 0.4 microns.

* * * * *